United States Patent [19]

Hauser et al.

[11] 4,124,857
[45] Nov. 7, 1978

[54] CAMERA

[75] Inventors: Raimund Hauser, Goldeggasse 2, 1040, Vienna, Austria; Harald Wessner, Neunkirchen, Austria

[73] Assignees: Karl Vockenhuber; Raimund Hauser, both of Vienna, Austria

[21] Appl. No.: 770,233

[22] Filed: Feb. 18, 1977

Related U.S. Application Data

[62] Division of Ser. No. 402,745, Oct. 2, 1973, Pat. No. 4,027,317.

[30] Foreign Application Priority Data

Oct. 3, 1972 [AT]  Austria .................................. 8460/72
Jun. 29, 1973 [AT] Austria .................................. 5726/73

[51] Int. Cl.$^2$ ........................ G03B 3/00; G03B 13/02; G03B 9/64
[52] U.S. Cl. .................................. 354/198; 354/238; 354/289

[58] Field of Search ................. 354/46, 289, 53, 60 EI, 354/70, 72, 81, 293, 198, 237, 238

[56] References Cited

U.S. PATENT DOCUMENTS

| 3,605,596 | 9/1971 | Vockenhuber et al. ......... 354/198 X |
| 3,714,878 | 2/1973 | Hasegawa et al. .................... 354/46 |

*Primary Examiner*—Richard A. Wintercorn
*Attorney, Agent, or Firm*—Montague & Ross

[57] ABSTRACT

A camera with a varifocal objective is equipped with an indicator which signals the existence of a condition unsuitable for the taking of pictures because of the risk of blurring, especially when the camera is held by hand, as where a large focal length is chosen together with a long exposure time. The indicator is overridden upon reduction of the risk by certain precautionary measures, including the use of a self-timer which generally involves placement of the camera on a stable support.

4 Claims, 4 Drawing Figures

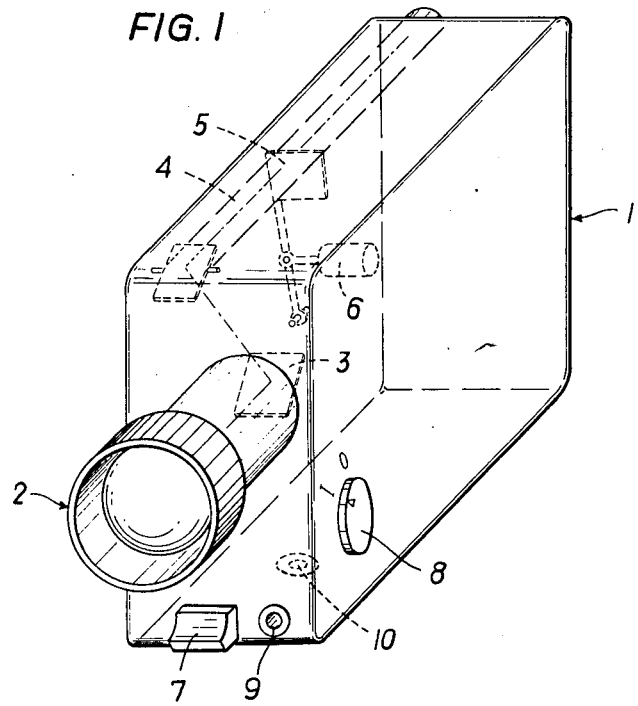
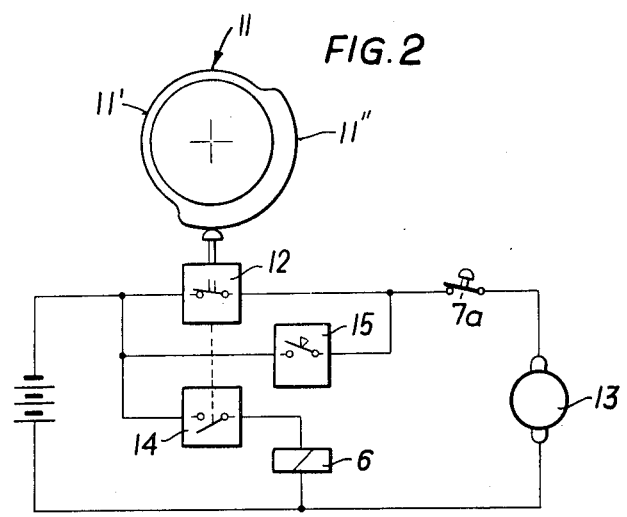

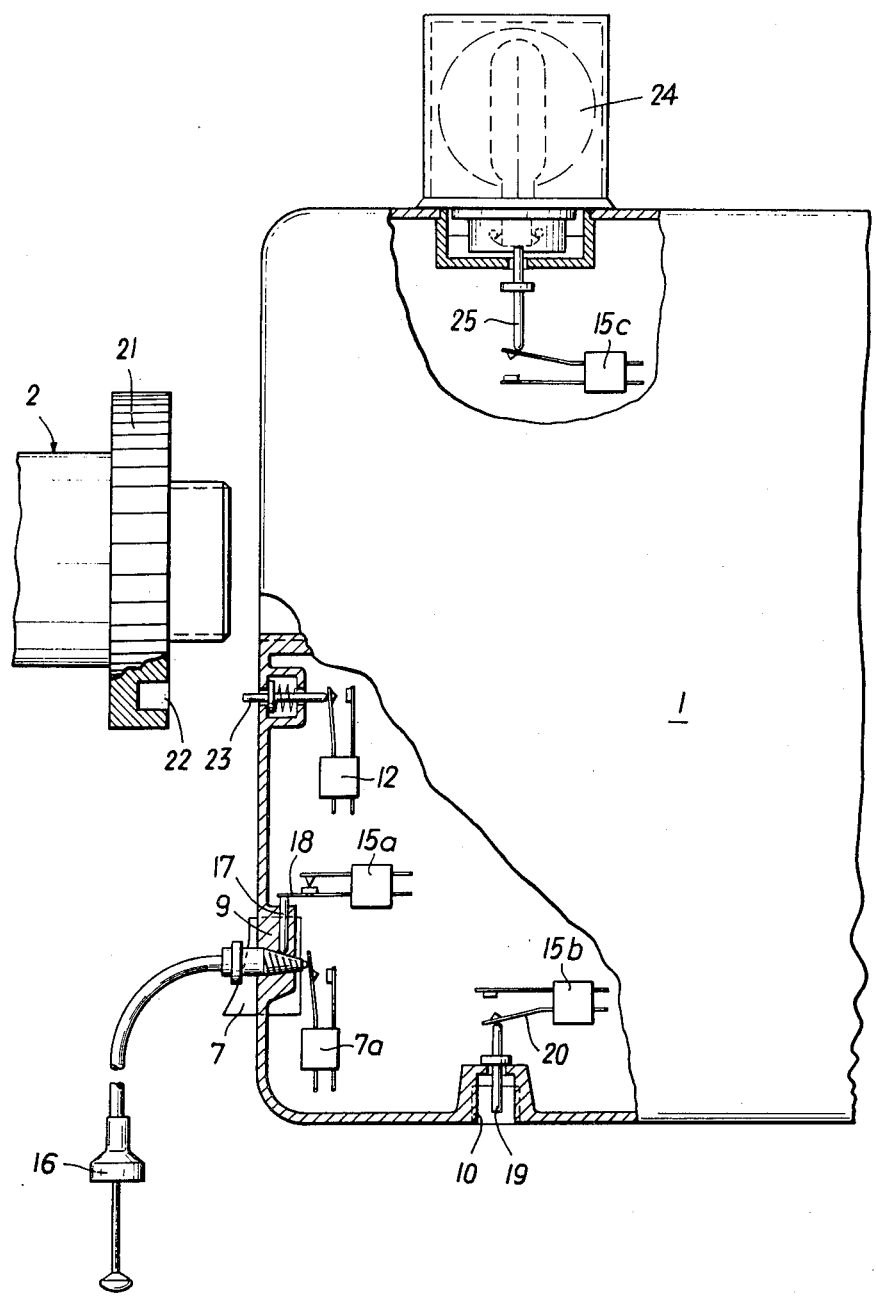

1

CAMERA

CROSS-REFERENCE TO RELATED APPLICATION

This is a division of our copending application Ser. No. 402,745 filed filed Oct. 2, 1973, now U.S. Pat. No. 4,027,317, issued May 31, 1977.

FIELD OF THE INVENTION

Our present invention relates to a camera whose optical system enables changes to be made in its focal length, either through the use of interchangeable lenses or with the aid of a varifocal (zoom-type) objective.

BACKGROUND OF THE INVENTION

In photography or cinematography, the sharpness of a picture depends on a variety of factors such as steadiness of the camera support, exposure time, and depth of field. Steadiness is poor when the camera is held by hand and can be improved through the use of a tripod, for example. The time of exposure of a photosensitive element depends on shutter speed but, under proper lighting conditions, can also be controlled by the flashing of a strobe light. Depth of field is a function of focal length, diaphragm aperture and object distance; under otherwise equal conditions, blurring is greatest with large focal lengths (e.g. with the use of telephoto lenses).

OBJECT OF THE INVENTION

The object of our invention is to provide means in a camera for automatically taking certain of the aforementioned factors into account in determining whether, in a given situation, a picture can be taken without objectionable blurring due to camera unsteadiness.

SUMMARY OF THE INVENTION

We realize this object, in accordance with our invention, by providing indicator means operatively coupled with the usual shutter-setting means of a camera for signaling an exposure time which is conducive to blurring due to unsteadiness, especially with a hand-held camera. Thus, the indicator means may be jointly controlled by the exposure-time means and by adjusting means for varying the focal length of the camera objective, a blurring signal being given only when the chosen focal length and exposure time exceed predetermined values. Actuation of the indicator means, however, is prevented by overriding means responsive to operation by the user of ancillary exposure-controlling means whose use reduces the risk of such blurring, e.g. a self-timer which generally is employed only when the camera is placed on a table or other support.

BRIEF DESCRIPTION OF THE DRAWING

Our invention will now be described in detail with reference to the accompanying drawing in which:

FIG. 1 is a perspective view of a camera embodying our invention;

FIG. 2 is a block diagram of a control circuit for a camera as shown in FIG. 1;

FIG. 3 is a somewhat schematic side view of a camera (partly broken away) incorporating a control circuit similar to that shown in FIG. 2.

SPECIFIC DESCRIPTION

Figure 4:
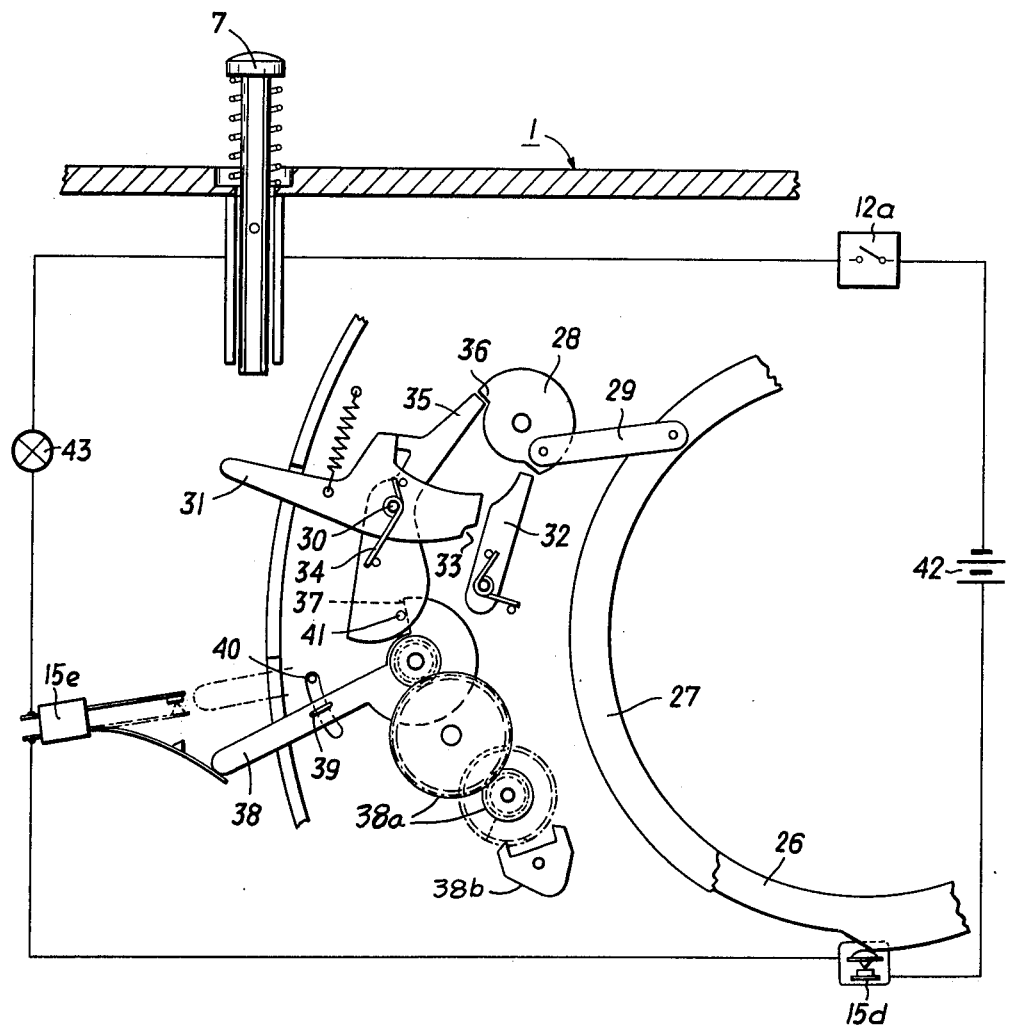
FIG. 4 shows details of a shutter-control mechanism for a camera according to our invention.

A camera 1 (FIG. 1), for instance a movie camera, has an objective 2. This objective 2 may either have a variable focal length or be of the interchangeable type, enabling lenses of very large focal length to be attached to the camera 1. As with reflex cameras in common use, a beam-splitter surface 3 reflects a portion of the incident light onto a ray path 4 for a viewfinder. According to the invention, the objective 2 is equipped with means indicating an excessive focal length which would entail a high risk of blurring with a given exposure time if the camera is held by hand. For signaling this condition, a vane 5 may be brought into the ray path of the viewfinder by a solenoid 6 or the like. If necessary, it is also possible to lock at the same time the shutter so that operation of a shutter release 7 will not cause the exposure of an image. In that case, however, it will be useful to provide inhibiting or overriding means for deactivating the locking device, and possibly the indicating device too, in case measures are taken whereby the danger of blurring may be avoided, as putting the camera on a table. Moreover, some blurring may be permissible in the case of exposures of documentary value. We therefore provide a cancellation knob 8 on the camera which disables the locking and/or the indicating device upon being rotated into position "0." Such inhibiting means may also coact with a shutter-release cable, receivable in a nipple 9, since this latter is generally used only when the camera is placed on a stable support. We may also provide inhibiting means at a tripod socket 10 so that the locking and/or indicating device can be deactivated when the tripod is screwed on.

FIG. 2 illustrates details of an embodiment wherein the objective 2 is of the varifocal type. A cam 11 is coupled for joint rotation with a nonillustrated ring for adjusting the focal length. The camera 1 has a motor 13 by which the shutter is driven. In the circuit of this motor there is inserted a trigger switch 7a whose closure normally energizes the motor 13. Cam 11 operates a schematically illustrated control switch 12 which lies in series with the trigger switch 7a and operates as a circuit breaker. Upon selection of a shorter focal length of the objective 2, a large-radius dwell 11" of the cam 11 holds the switch 12 closed. On the other hand, with a larger focal length of the objective 2, a small-radius dwell 11' of the cam 11 engages the circuit breaker 12 and allows it to open.

Trigger switch 7a and control switch 12 may be considered the equivalent of a logic AND-gate, since the motor 13 runs and operates the shutter of camera 1 only if both switches are closed. Switch 12 therefore effectively locks the shutter when, upon adjusting the objective 2, a focal length exceeding a predetermined magnitude is selected. However, with varifocal objectives it may happen that during zooming the exposure will be interrupted. Therefore such a locking device is more advantageous for a camera with interchangeable lenses. On the other hand, with varifocal objectives it is more advantageous if the motor 13 is a zooming motor operable by means of switch 7a to increase the focal length. Then, as soon as the objective reaches the telephoto position, the low dwell 11' of cam 11 opens the switch 12 so that at first the motor 13 is de-energized. At the same time another switch 14 is closed to energize the solenoid 6 which indicates to the user that he must take certain precautions against blurring. Control switch 12 is shunted by an overriding switch 15. The combination of switches 12 and 15 may be regarded as the equivalent of a logic OR-gate because closure of either of them enables the switch 7a to energize the motor 13. The overriding switch 15 may be operable by hand or in the manner illustrated in the following Figures. Naturally, switches 12, 14, 15 or their logical counterparts may be realized in different manner.

In FIG. 3 the electrical connections of various switches 12, 15a, 15b, 15c, similar to those of FIG. 2, have been omitted for the sake of clarity. Trigger switch 7a is here shown operable not only by a button 7 but also by a cable 16 which is screwed into the nipple 9. In the nipple 9 there is provided a pin 17 which in the absence of cable 16 is depressed by a contact spring 18 of shunt switch 15a. When, however, the cable 16 is screwed in, the pin 17 is displaced so that the switch 15a is closed. A further pin 19 provided in the socket 10 is depressed by a contact spring 20 of shunt switch 15b into the illustrated position in the absence of a tripod.

In the embodiment according to FIG. 3 the objective 2 is interchangeably attached to the camera 1. The objective 2, assumed to be of large focal length, has a flange 21 with an annular recess 22. When a lens assembly of objective 2 is replaced by one of short focal length whose flange 21 lacks the recess 22, the circuit breaker 12 is closed by means of a pin 23, whereas in the illustrated case the pin 23 projects into the recess 22 and the switch 12 stays open. The camera may be used only if one of the overriding switches 15a or 15b is closed or a flash cube 24 for extremely short exposure time is attached. This flash cube 24 co-operates with a pin 25, similar to the pins 17 and 19, which controls the third overriding switch 15c. A camera whose housing carries feeler means as shown in FIG. 3 has been claimed in U.S. Pat. No. 4,027,317 which issued on our application Ser. No. 402,745 referred to above on May 31, 1977.

FIG. 4 illustrates a further embodiment wherein a photographic camera 1 is provided at its top with a shutter-release button 7. A conventional shutter mechanism comprises a setting ring 26 for selecting the shutter speed and an actuating ring 27 for the nonillustrated shutter sectors driven by a disk 28 whose movement is transmitted to the ring 27 via a link 29. The tensioning mechanism for the driving disk 28 is likewise well known and therefore not shown.

In order to trip the shutter, the button 7 co-operates with a release lever 31 having a pivot 30. If this release lever is turned in counterclockwise direction by depressing the button 7, the release lever 31 is arrested in this position by a locking pawl 32 which snaps in behind a shoulder 33. With the release lever 31 a further lever 35, which normally blocks the driving disk 28, is resiliently connected by a hairpin spring 34. As soon as the lever 35 has cleared a projection 36 of the disk 28, the shutter is released.

The shutter described above is provided with a self-timer of well-known construction which includes a presetting lever 38, a gear train 38a and a double pawl 38b. The release of lever 35 is controlled not only by the detent 31 but also by a face 37 of lever 38. The latter has a lug 39 engaging a stop 40 in a rest position of lever 38 in which the face 37 is removed from the path of a pin 41 on lever 35 so that this lever may follow the movements of the release lever 31. On the other hand, the disengagement of detent 35 from disk 28 is delayed to a greater or less extent in all other positions of presetting lever 38.

The system of FIG. 4 is provided, according to our invention, with an indicator circuit including a source of current 42 in series with a control switch 12a generally similar to the switch 12 of FIG. 3, except that switch 12a is closed when the focal length of the objective exceeds a certain value. Such closure energizes a signal lamp 43 which is visible in the viewfinder.

Here, again, inhibiting or overriding switches 15d, 15e are provided which deactivate the warning lamp 43 when measures are taken which avoid blurring of the pictures due to unsteadiness. Such measures may consist in setting very short exposure times by means of the adjusting ring 26. Therefore the adjusting ring 26 has a cam, similar to cam 11 of FIG. 2, by which upon a setting to high shutter speeds the switch 15d will be opened. As the switches 12a and 15d are in series, the lamp 43 lights only if both switches are closed. Switch 15e is controlled by the adjusting lever 38 of the self-timer which generally is used only when the camera is placed on a stable support such as a table. As may be seen, the switch 15e is closed in the rest position of the lever 38, indicated in dotted lines, whereas it is opened when the self-timer is preset as shown in full lines.

We claim:

1. In a camera provided with objective means, trigger means for exposing a photosensitive element to light from said objective means, and exposure-time-setting means for selecting a desired exposure time, in combination:

indicator means operatively coupled with said exposure-time-setting means for signaling an exposure time conducive to blurring due to camera unsteadiness;

ancillary exposure-controlling means whose use reduces the risk of such blurring;

operating means for optionally activating said ancillary exposure-controlling means; and overriding means in said housing coupled with said operating means for preventing actuation of said indicator means upon activation of said ancillary exposure-controlling means.

2. The combination defined in claim 1 wherein said ancillary exposure-controlling means comprises a self-timer.

3. The combination defined in claim 2 wherein said operating means comprises a lever, said overriding means including a switch coacting with said lever.

4. The combination defined in claim 1, further comprising adjusting means for varying the focal length of said objective means, said indicator means being jointly controlled by said exposure-time setting means and said adjusting means for actuation only with focal lengths and exposure times exceeding predetermined values.

* * * * *